(12) United States Patent
Robaina

(10) Patent No.: US 10,493,669 B1
(45) Date of Patent: Dec. 3, 2019

(54) BALLOON MOLD FORM FOR FORMING A BALLOON WITH APPENDAGES

(71) Applicant: Carlos Robaina, Boynton Beach, FL (US)

(72) Inventor: Carlos Robaina, Boynton Beach, FL (US)

( * ) Notice: Subject to any disclaimer, the term of this patent is extended or adjusted under 35 U.S.C. 154(b) by 0 days.

(21) Appl. No.: 16/291,442

(22) Filed: Mar. 4, 2019

(51) Int. Cl.
*B29C 41/40* (2006.01)
*B29C 41/14* (2006.01)
*B29L 22/02* (2006.01)

(52) U.S. Cl.
CPC .............. *B29C 41/40* (2013.01); *B29C 41/14* (2013.01); *B29L 2022/022* (2013.01)

(58) Field of Classification Search
CPC .... B29C 41/14; B29C 41/40; B29L 2022/022
See application file for complete search history.

(56) References Cited

U.S. PATENT DOCUMENTS

| | | |
|---|---|---|
| 2,077,752 A | 4/1937 | Frissell |
| 2,389,009 A | 11/1945 | Tillotson |
| 2,503,358 A | 4/1950 | Sidnell |
| 2,515,727 A | 7/1950 | Morr et al. |
| 2,685,758 A | 8/1954 | Ochs |
| 4,943,225 A | 7/1990 | Prater |
| D315,749 S | 3/1991 | Visco et al. |
| 5,340,350 A | 8/1994 | Fink et al. |
| D497,400 S | 10/2004 | Dykstra |
| 8,262,430 B2 | 9/2012 | Ivanic et al. |
| 9,056,404 B2 | 6/2015 | Bickel et al. |
| 9,751,024 B2 | 9/2017 | Morita et al. |
| 2007/0077855 A1 | 4/2007 | Ivanic et al. |
| 2012/0184176 A1 | 7/2012 | Gardner et al. |

FOREIGN PATENT DOCUMENTS

WO 1991003363 3/1991

*Primary Examiner* — James Sanders
(74) *Attorney, Agent, or Firm* — The Concept Law Group, PA; Scott M. Garrett; Scott D. Smiley

(57) ABSTRACT

A mold form for molding balloons includes a mold form body having multiple linear appendages which extend from the mold form body to create body portions of the balloon. Upon inflating the balloon, the body portions created by the appendages form portions of a shape or features similar to some recognizable object. The appendages on the mold form body are arranged to extend from the mold form body in a way that allows the balloon to be removed from the mold form body using conventional mass manufacturing techniques, but which also produce body portions of the balloon at locations on the balloon, and at angles which allow the body portions to resemble familiar shapes rather than a conventional balloon shape.

16 Claims, 21 Drawing Sheets

BALLOON MOLD FORM FOR FORMING A BALLOON WITH APPENDAGES

FIELD OF THE INVENTION

The present invention relates generally to an apparatus for creating inflatable balloons that stretch when inflated, and, more particularly, relates to a balloon mold form having appendages that cause the balloon, upon inflating and stretching, to resemble a particular shape.

BACKGROUND OF THE INVENTION

Balloons are commonly used for toys and decorations, and in widespread use as such. A balloon, as the term is used here, refers to an inflatable article, typically made of a latex rubber material, that, upon being inflated, stretches to a larger size relative to its uninflated size. The most common balloon shapes are that of a spherical or ovoid/pear shape, and the elongated cylindrical shape. These balloons are generally created on a simple mold form by dipping the mold form in liquid latex rubber, creating a layer of latex rubber over the mold form. Upon curing, the formed balloon is removed from the mold form by a combination of air pressure at the nozzle end of the balloon and suction at the distal end of the mold form. The pressurized air separates the cured latex rubber from the mold form, which allows the suction to pull the balloon off the mold form.

The pressure/suction form of mass manufacture limits the shapes of balloons that can be produced using this technique. A major limitation is that there cannot be any portion of the mold form that extends outward from the mold form at a substantial angle. So, for example, forming a balloon to resemble a human figure with outstretched arms (e.g. at about a 90 degree angle to the mold form) can't be achieved because of the limitation of having to stretch the nozzle over such features of the mold form. Other types of inflatable articles that are not intended to stretch (e.g. that are made with vinyl-based materials) are produced in all manner of shapes. These can be made in halves that are joined together. Hollow articles made of rubber or similar materials can also be made on mold forms with various features to resemble recognizable shapes, but these are removed from the mold form by means other than a pressure/suction method.

Balloons can be made in a variety of shapes, with some limitations, on mold forms that cannot be used in the pressure/suction method of mass manufacture, requiring removal of the balloon by hand. Techniques for creating a mold form to achieve a desired shape of a balloon when inflated, taking stretching of the material into account, are described in U.S. Pat. No. 9,056,404. The method described therein uses a sophisticated computational approach to determine a rest shape from an inflated shape. However this approach fails to take into account the limitations of the pressure/suction method of mass manufacture.

Therefore, a need exists to overcome the problems with the prior art as discussed above.

SUMMARY OF THE INVENTION

Embodiments of the inventive disclosure provides a balloon mold form for forming a balloon with appendages that overcomes the heretofore-mentioned disadvantages of the heretofore-known devices and methods of this general type and that allows the formation of appendages along the balloon body in a way that allows for the mass manufacturing of the balloons.

With the foregoing and other objects in view, there is provided, in accordance with some embodiments, a balloon mold form for producing a shaped balloon that stretches upon inflation and having multiple appendages. The balloon mold form includes an elongated neck portion that defines a longitudinal axis, and a mold form body that depends from the elongated neck portion at an upper-most portion of the mold form body. The mold form body extends generally along the longitudinal axis, and has at least one upper appendage that has a standoff portion which depends from the mold form body at an attachment location on the mold form body. The at least one upper appendage also includes an appendage body that is spaced away from the mold form body and extends from the standoff portion towards a distal end of the mold form body substantially parallel to the longitudinal axis.

In accordance with another feature, the mold form body can also include at least one lower appendage that depends from the mold form body at the distal end of the mold form body, and which extends away from the mold form body in a direction that is substantially perpendicular to the longitudinal axis.

In accordance with another feature, the at least one lower appendage comprises two lower appendages, each one of the two lower appendages forming a mirrored shape of the other lower appendage.

In accordance with another feature, the mold form body comprises a flat major portion between the at least one upper appendage and the at least one lower appendage.

In accordance with another feature, the mold form body further comprises a head portion formed at a point where the mold form body depends from the elongated neck portion.

In accordance with another feature, the head portion does not depend from the mold form body.

In accordance with another feature, the flat major portion has a width that is wider than a width of the elongated neck portion.

In accordance with another feature, the mold form body is split into at least two parallel body segments extending parallel along the longitudinal axis.

In accordance with another feature, the at least one upper appendage comprises two upper appendages, each one of the two upper appendages forming a mirrored shape of the other.

In accordance with another feature, the standoff portion of each of the two upper appendages comprises a relief formed on an outside of the standoff portion that runs parallel to the longitudinal axis such that each standoff portion is narrower than the appendage body.

In accordance with another feature, each of the at least two lower appendages include a relief formed on an outside of each one of the at least two lower appendages, the relief on each one of the at least two lower appendages extends parallel to the longitudinal axis at a location adjacent the mold form body.

In accordance with another feature, there can be further included at least one intermediate appendage depending from the mold form body between the at least one upper appendage the at least one lower appendage.

In accordance with another feature, the elongated neck portion is cylindrical.

There is further provided, in accordance with some embodiments, a balloon mold form for creating an inflatable balloon that stretches upon inflation, and which has a shape including appendages when inflated, the balloon mold form includes an elongated neck portion that defines a longitudinal axis, and a mold form body depending from the elongated neck portion at a lower-most portion of the mold form body. The mold form body extends generally along the longitudinal axis, and includes at least two upper appendages, each of the at least two upper appendages having a standoff portion that depends from the mold form body at an attachment location on the mold form body, and an appendage body that is spaced away from the mold form body and extends from the standoff portion towards a distal end of the mold form body substantially parallel to the longitudinal axis. The mold form body further includes at least one lower appendage that depends from the mold form body at the distal end of the mold form body, and which extends away from the mold form body in a direction that is substantially perpendicular to the longitudinal axis.

In accordance with another feature, the standoff portion of each of the two upper appendages comprises a relief formed on an outside of the standoff portion that runs parallel to the longitudinal axis such that standoff portion is narrower than the appendage body.

In accordance with another feature, the mold form body comprises a flat major portion between the at least two upper appendages and the at least one lower appendage, and which defines a plane.

In accordance with another feature, the at least one lower appendage extends from the flat major portion contiguously and in the plane of the flat major portion.

In accordance with another feature, the at least one lower appendage extends from the flat major portion in a direction normal to the plane of the flat major portion.

In accordance with another feature, the mold form body is split into at least two parallel body segments extending parallel to the longitudinal axis, and the at least one lower appendage comprises two lower appendages, each one of the two lower appendages extending from a distal end of a respective one of the at least two parallel body segments.

In accordance with another feature, the at least one lower appendage comprises two lower appendages, each one of the two lower appendages forming a mirrored shape of the other, and wherein each of the two lower appendages comprise a relief formed on an outside of the lower appendage that extends across the appendage parallel to the longitudinal axis at a location adjacent the mold form body.

Although the invention is illustrated and described herein as embodied in a balloon mold form for forming a balloon with multiple appendages, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the balloon mold body. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
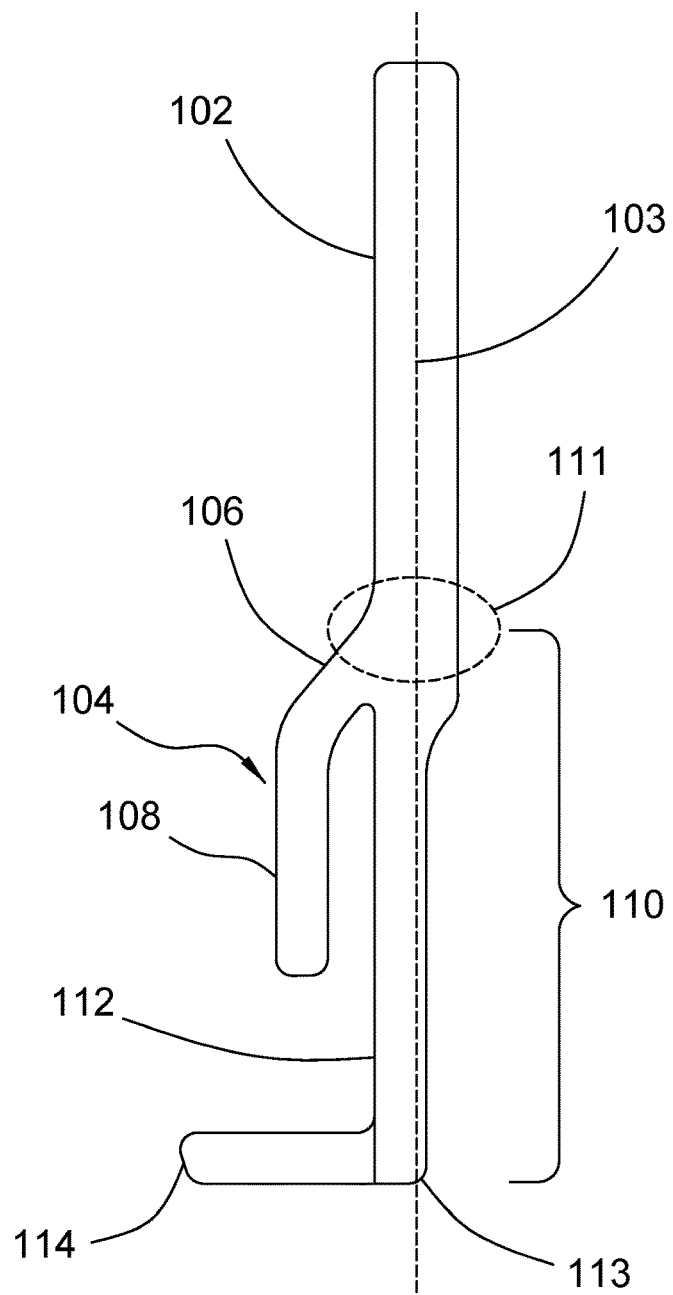
FIG. 1 is a side elevational view of a mold form for making balloons having multiple appendages, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel balloon mold form for the mass production of balloons having multiple appendages. Embodiments disclosed herein include mold forms with upper and lower appendages that are used to create balloons by dipping the mold forms into a composition of latex rubber, and then letting the latex rubber adhering to the mold form to cure, to create a balloon having multiple appendages. As used herein, the term "balloon" refers specifically to an article made of an elastic material that stretches upon inflation of the balloon such that the inflated balloon is substantially larger than the un-inflated (rest) balloon. This is distinct from articles that are merely inflatable that are made using a compliant, but relatively inelastic material that does not significantly stretch when the article is inflated.

Figure 2:
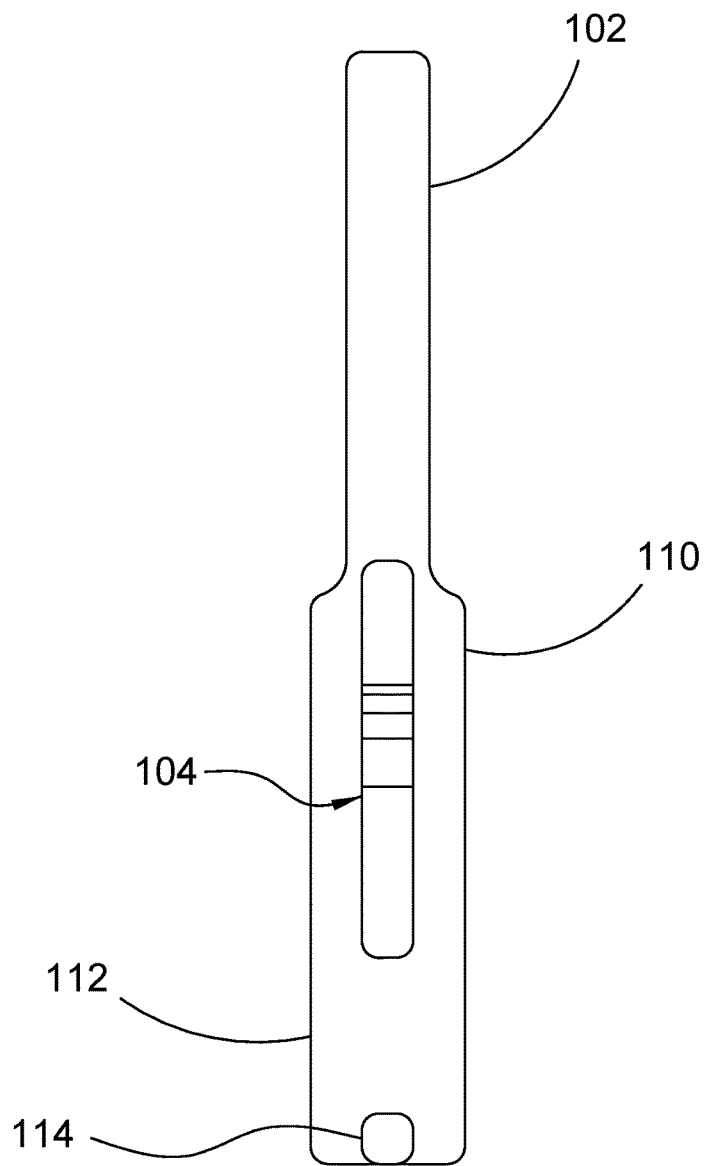
FIG. 2 is a front elevational view of a mold form for making balloons having multiple appendages, in accordance with some embodiments.
Figure 3:
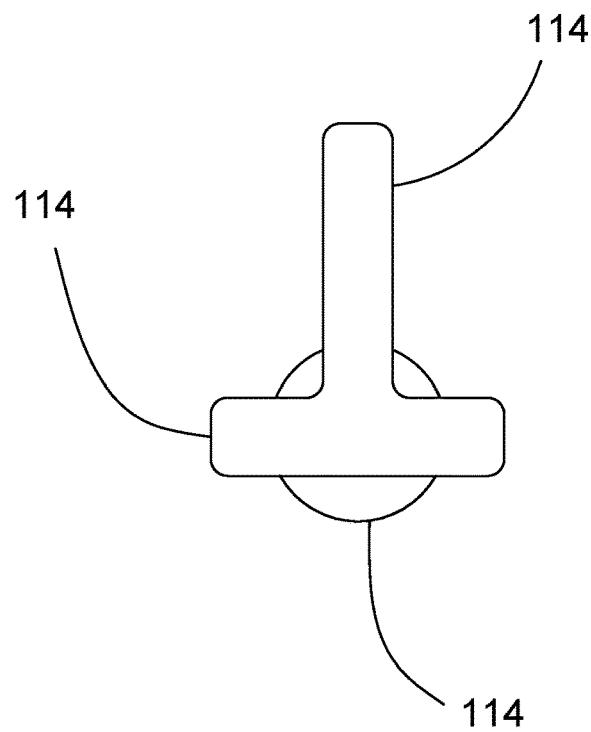
FIG. 3 is a bottom plan view of a mold form for making balloons having multiple appendages, in accordance with some embodiments.

FIG. 1 is a side elevational view of a mold form 100 for making balloons having multiple appendages, in accordance with some embodiments. FIG. 2 shows a front elevational view of the mold form 100, and FIG. 3 shows a bottom plan view of the mold form 100. The reference numerals used in FIG. 1 are therefore carried forward in FIGS. 2-3. The mold form 100 is first treated with a coagulant and then dip into a liquid composition such as latex rubber to create a balloon that, at rest (i.e. un-inflated) can have a shape substantially similar to that of the mold form 100. Upon being dipped and then lifted from the liquid, a layer of the liquid composition adheres to the surface of the mold form 100. Upon curing to an elastic solid, the cured material is removed from the mold form 100 as a balloon that can then be inflated. The resulting balloon includes several appendages, and the mold form 100 allows mass production of balloons by using the pressure/vacuum technique for removing the cured balloon from the mold form 100.

The mold form 100 includes an elongated neck portion 102 that supports a mold form body 110. The elongated neck portion 100 defines a longitudinal axis 103 (i.e. a vertical axis), and the mold form body 110 depends from the elongated neck portion at an upper-most portion 111 of the mold form body 110, which is also the lower-most portion of the elongated neck portion 102. Mold form body 110 includes at least one upper appendage 104 and at least one lower appendage 114. The upper appendage 104 includes a standoff portion 106 that joins an appendage body 108 to the mold form body 110 at an attachment location, and spaces the appendage body away from the mold form body 110. The appendage body 108 extends from the standoff portion 106 downward in a direction substantially parallel to the axis 103 defined by the elongated neck portion 102. By "substantially parallel" it is meant that the angle of the appendage body 108 relative the axis 103 is less than a maximum angle that prevents the use of the pressure/vacuum method of mass production. More specifically, that means the angle between the appendage body 108 and the axis 103 is zero to about fifteen degrees, depending on the length of the appendage body 108. The appendage body 108 can be cylindrical, or tapered, or any generally elongated solid shape. It is important that the appendage body 108 of the upper appendage 104 be substantially parallel to the axis in order to facilitate removal of formed balloons using mass production techniques. However, upon inflation of the balloon, the portion of the balloon formed by the upper appendage 104 is extend at a much greater angle to the axis of a main balloon body that formed along the axis 103. In some embodiments, the portion of the balloon formed by the upper appendage 104 can extend away from the main balloon body at close to ninety degrees.

In some embodiments the mold form body can include a flat major portion 112 which can extend downward to a distal end 113 of the mold form body 110. The lower appendage extends away from the mold form body at or near the distal end 113 at an angle that is substantially perpendicular to the axis 103. The length of the lower appendage 114 can vary, but must be short enough to enable the pressure/vacuum mass production technique. Upon a balloon created using mold form 100 being inflated, the portion of the balloon formed by the lower appendage 114 will generally extend away from the main body axis in a substantially perpendicular direction. In FIG. 2 is can be seen that the flat major body portion 112 has a dimension that is wider than the elongated neck portion 102. In FIG. 3 it can be seen that the elongated neck portion 102 can be cylindrical.

Figure 4:
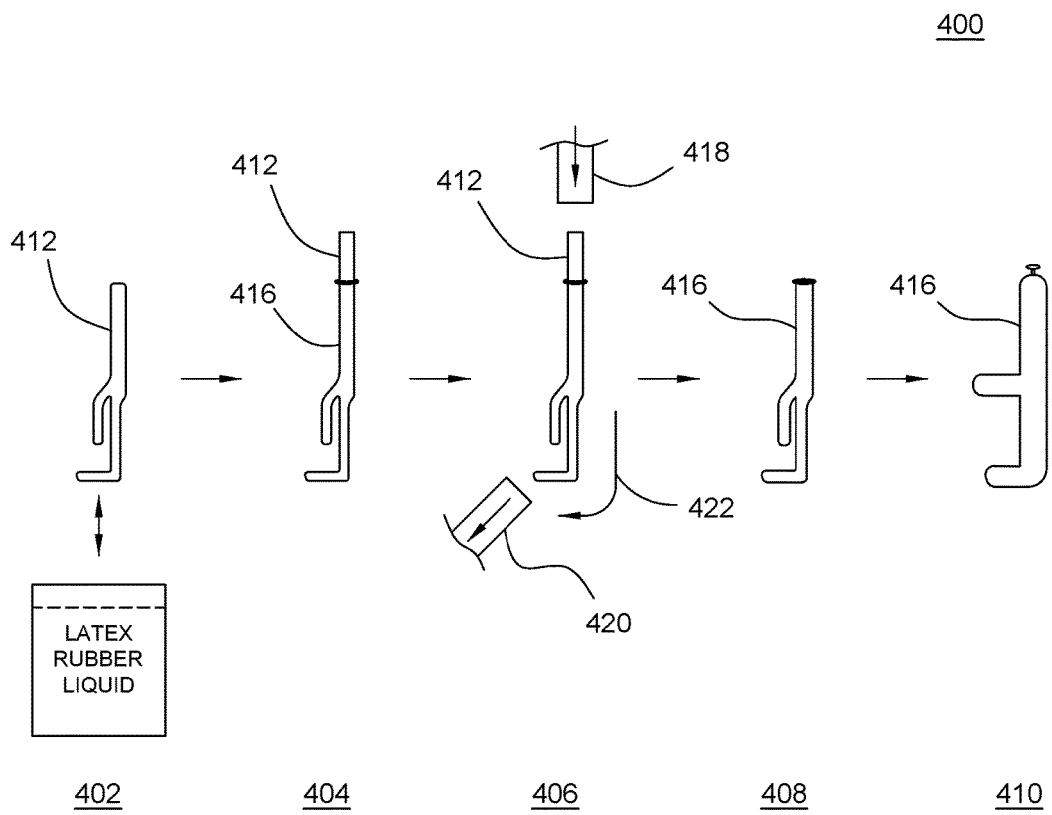
FIG. 4 is a sequence diagram showing the creation of a balloon having multiple appendages in a mass manufacturing context using a mold form in accordance with some embodiments.

FIG. 4 is a sequence diagram 400 showing the creation of a balloon having multiple appendages in a mass manufacturing context using a mold form in accordance with some embodiments. In general, the sequence diagram shows several stages 402-410 for creating a balloon. In a first stage 402 a mold form 412 can be dipped into a liquid material 414 such as liquid latex rubber or any other material suitable for creating balloons. The mold form 412 can be shaped like any of the mold forms disclosed herein, or any mold form configured according to the design principles disclosed herein, and can be pre-treated with talc which facilitates adherence of the liquid 414 onto the mold form 412. After dipping in the first stage, then in a second stage 404 a shaped balloon 416 is created on the mold form 412 when the layer(s) of material cures. During the curing process the balloons can be further treated to cause vulcanization of the balloon material. In a third stage 406, a lip can be formed on the balloon using opposing rollers or brushes that roll the balloon material on the neck of the mold form 412. Further, the balloon 416 is removed from the mold form 412 using a combination of air pressure from a nozzle 418 that blows air over the surface of the mold form 412 to separate the balloon 416 from the mold form and partially inflate the balloon 416, and a suction or vacuum created at an intake tube 420 that pulls the partially inflated balloon 416 off the mold form 412. Equivalently, opposing rollers can be used to remove the partially inflated balloon 416 from the mold form 412, as is known. After being removed, then in the fourth stage 408 the balloon 416 (with many other balloons) can be washed and further treated for vulcanization, and is then ready to be packaged and sold. In the fifth stage 410, which can occur after being sold, the balloon 416 can be inflated and takes on an intended shape. Here it can be seen that, although the upper appendage was substantially parallel with the body of the mold form 412, the portion of the balloon formed by the upper appendage extends outward, away from the main body of the balloon. This is a natural result of the pressure inside the balloon acting on the balloon material. Furthermore, appendages, if not properly sized, can be essentially "absorbed" into the main body of a balloon upon inflating the balloon. To ensure that an appendage has the intended visual effect upon inflating a balloon formed using a mold form with appendages, a ratio of at least three to one (3:1) of appendage length to width/diameter of an appendage of a mold form is followed to ensure that an appendage created by the mold form in the inflated balloon appears like a portion extending from the balloon body and not merely a bump or hump on the balloon body.

Figure 5:
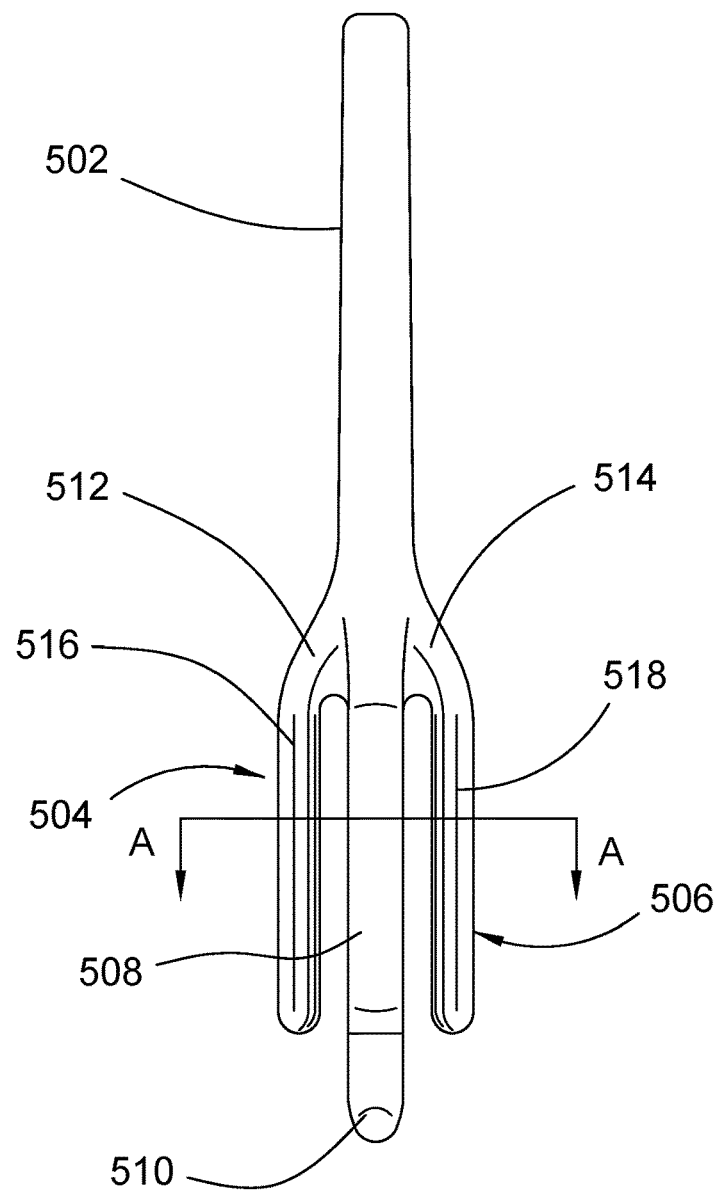
FIG. 5 is a front elevational view of a mold form for making balloons having multiple appendages, in accordance with some embodiments.
Figure 6:
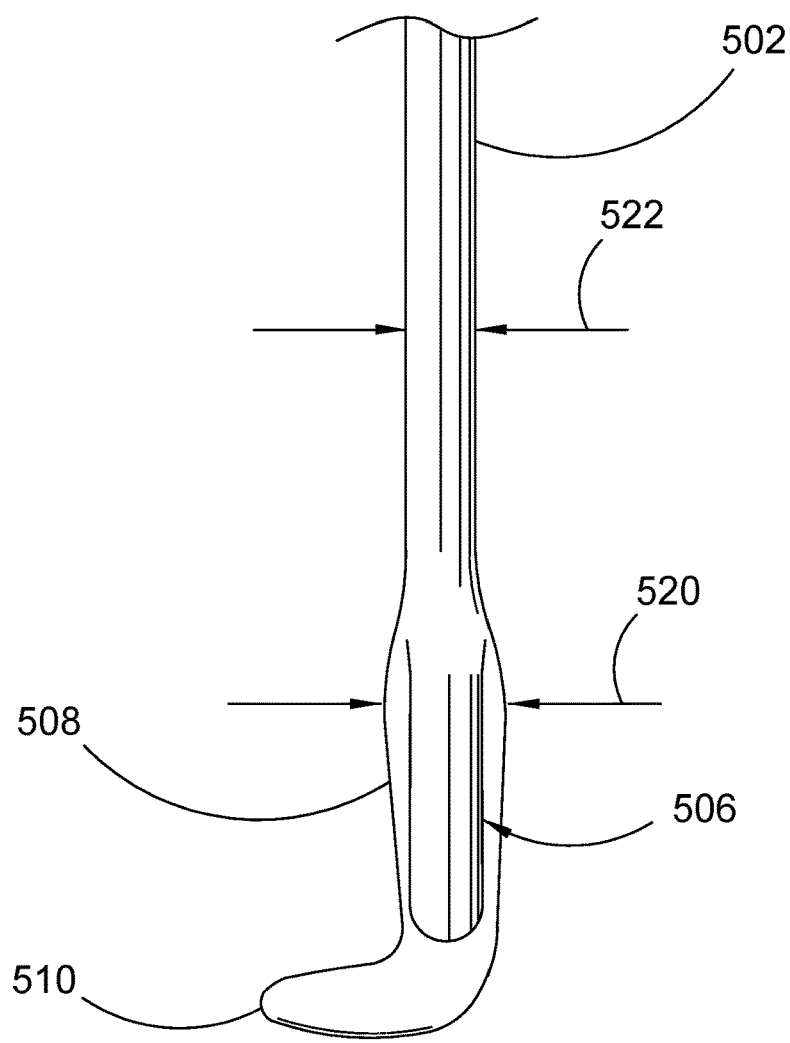
FIG. 6 is a side elevational view of a mold form for making balloons having multiple appendages, in accordance with some embodiments.
Figure 7:
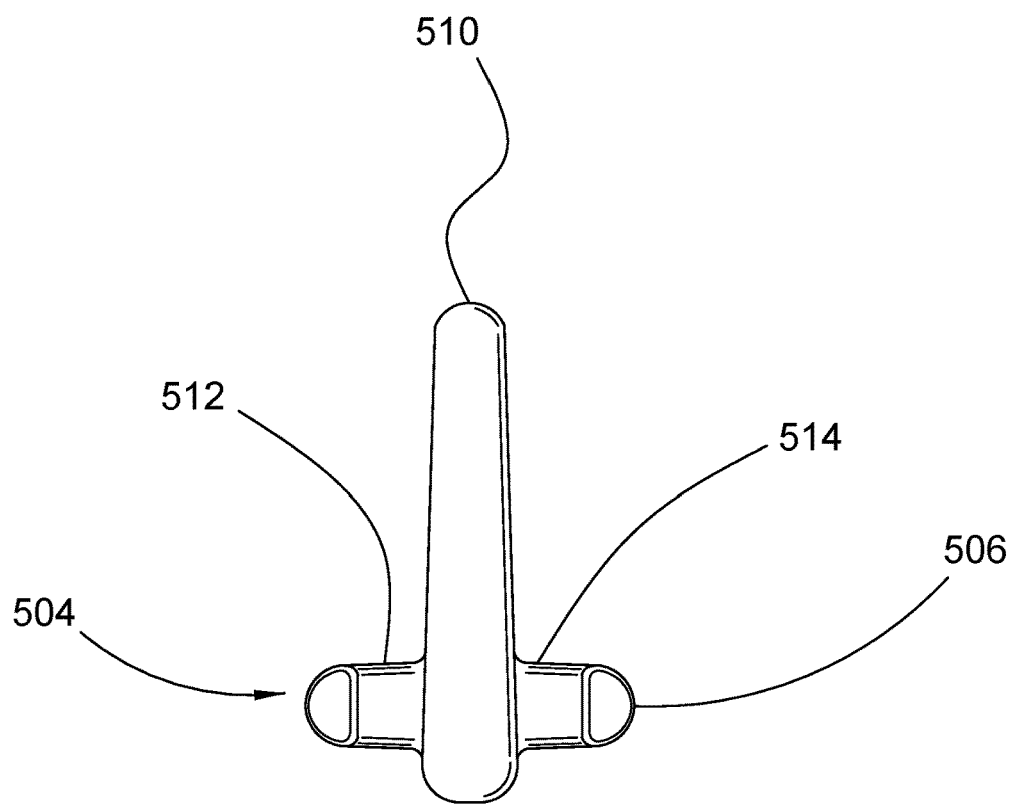
FIG. 7 is a bottom plan view of a mold form for making balloons having multiple appendages, in accordance with some embodiments.

FIG. 5 is a front elevational view of a mold form 500 for making balloons having multiple appendages, in accordance with some embodiments. In particular, the mold form 500 is configured to create balloons that, upon being inflated, resemble an airplane shape. FIG. 6 shows a side elevational view of the mold form 500, and FIG. 7 shows a bottom plan view of the mold form 500. The mold form 500 includes an elongated neck portion 502 that integrally joins to the mold form body, and which defines an axis along the neck (i.e. vertically as shown in FIGS. 5-6). The mold form body includes a pair of opposing upper appendages 504, 506 which extend downward, substantially parallel to the axis of the elongated neck portion 502, flanking a central body member 508. These upper appendages 504, 506 are configured to form portions of a balloon that resemble wings of an airplane. At the distal end (bottom) of the central body member 508 is a lower appendage 510 which extends in a direction that is substantially perpendicular to the axis of the elongated neck portion 502 and the central body member 508. The lower appendage 510 is configured to form a portion of the balloon that resembles the tail/rudder of an airplane. The upper appendages 504, 506 include, respectively, standoff portions 512, 514, and appendage bodies 516, 518. The standoff portions 512, 514 space the appendage bodies 516, 518 away from the central body member 508. In the exemplary embodiment of FIGS. 5-7, the appendage bodies 516, 518 do not extend below (or beyond) the distal end of the central body member 508 or the lower appendage 510.

In FIGS. 5-6 it can be seen that the central body member 508 is a flat or flattened member. In particular, in FIG. 6 it can be seen that at the upper portion of the central body member, nearest the elongated neck portion 502, the width of the central body member tapers outward to a width 520 that is wider than the diameter or width 522 of the elongated neck portion 502. The widest point of the central body member 508 is adjacent, and below the location where the standoff portions 512, 514 meet the mold form body. Further, the flattened central body member 508 and the lower appendage 510, which is also flattened, define a plane that, in FIG. 5, is normal to the page, and in FIG. 6 is parallel to the page.

Figure 18:
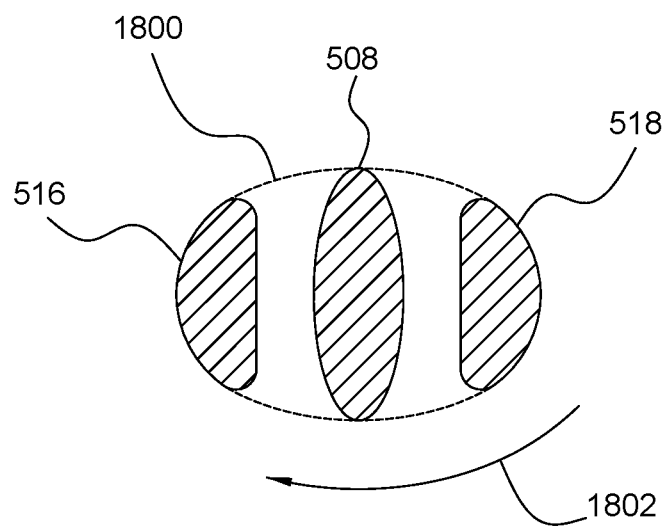
FIG. 18 is a cross section view of FIG. 5 at line AA.

FIG. 18 shows a cross section view of FIG. 5 along line AA. It can be seen that the central body member 508, and appendage bodies 516, 518 are shaped to fit within an ellipse 1800. The ellipse 1800 has a girth as measured around the ellipse as indicated by arrow 1802. From the neck portion 502 downward in FIGS. 5-6 an ellipse, circle, or other rounded shape can be drawn around the cross sectioned region, and the girth at any point along the mold form 500 must be smaller than a maximum girth over which the nozzle of the balloon formed on the mold form 500 will stretch over in order to allow the balloon to be removed from the mold form 500. Furthermore, squared edges are to be avoided to prevent thinning of the balloon material, which can be a point of tearing upon removing the balloon from the mold form, or when inflated. Thus, as it can be seen in FIG. 18, the outside surfaces (e.g. those along the ellipse) of the body member 508 and appendage bodies 516, 518 conform to a rounded shape such as the ellipse 1800. In general, to ensure that the nozzle of a balloon created on a mold form can stretch, without breaking, a girth or circular circumference can be determined that is the maximum girth over which the nozzle will reliably stretch. A narrow ellipse can result in too much lateral stretching, thus it is preferred to use a circle or an ellipse that is close to a circle (e.g. height to width ratio of not less than 0.8, or otherwise constrained by a maximum lateral stretch that can occur). Or more generally, a maximum girth and a maximum distance between the points farthest apart on the elliptical shape can be determined for a given nozzle diameter, and the mold form must then be designed such that at no point along the mold form does the cross section exceed those constraints. It should be further noted that, upon immersing the mold form 500 in the balloon material (e.g. latex), the balloon material will surround each element shown, 508, 516, 518 to form separate portions of a balloon.

Figure 8:
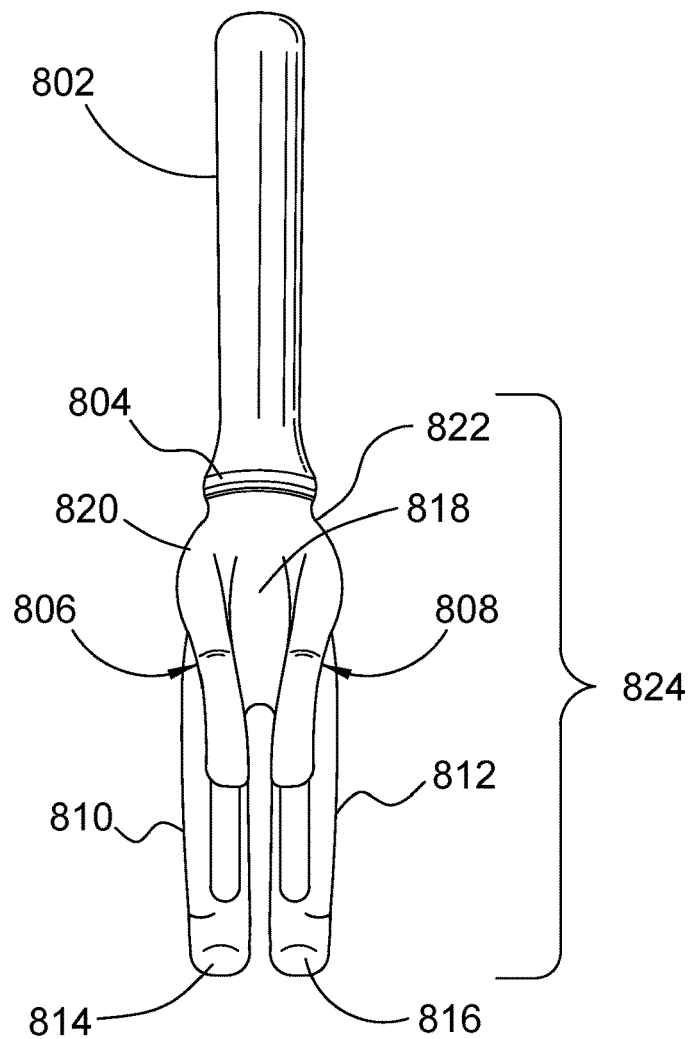
FIG. 8 is a front elevational view of a mold form for making balloons having multiple lower appendages, in accordance with some embodiments.
Figure 9:
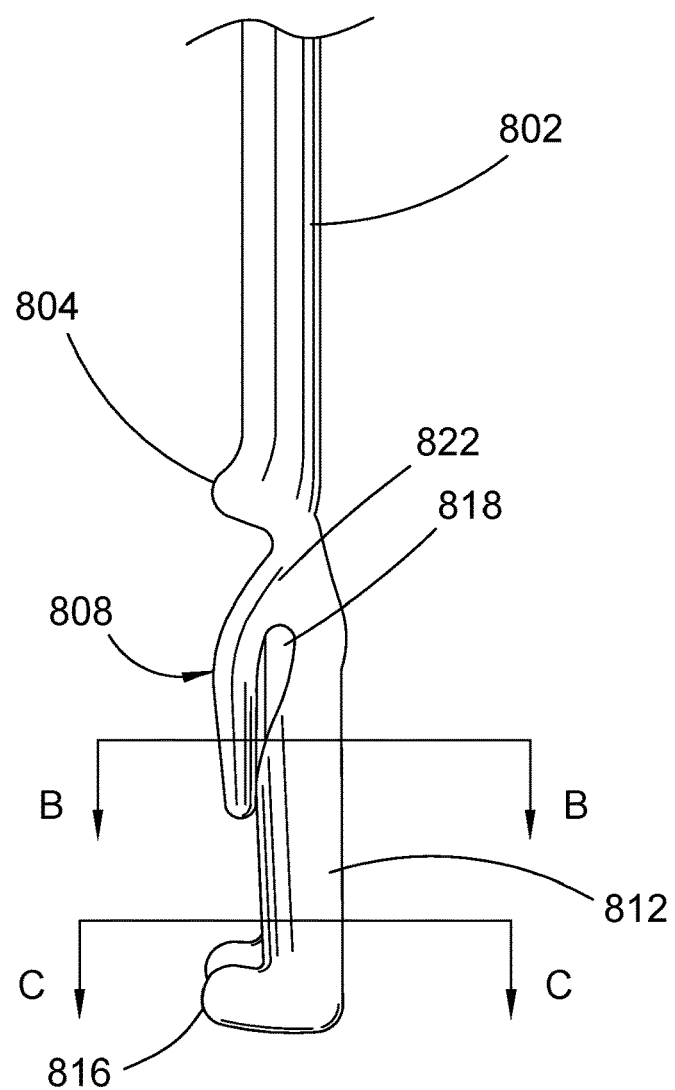
FIG. 9 is a side elevational view of a mold form for making balloons having multiple lower appendages, in accordance with some embodiments.
Figure 10:
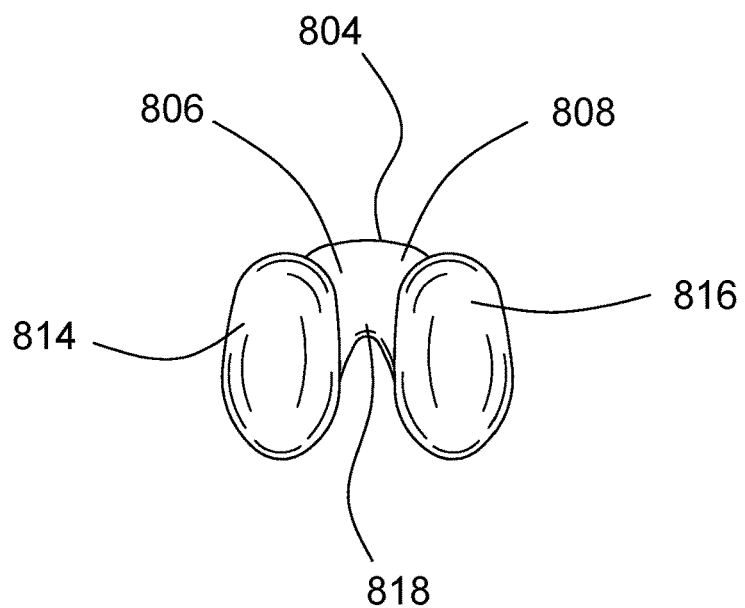
FIG. 10 is a bottom elevational view of a mold form for making balloons having multiple lower appendages, in accordance with some embodiments.

FIG. 8 is a front elevational view of a mold form 800 for making balloons having multiple lower appendages, in accordance with some embodiments. FIG. 9 shows a side elevational view of the mold form 800 and FIG. 10 shows a bottom plan view of the mold form 800. The mold form 800 is configured to form a balloon that, when inflated, produces a shape resembling a human figure. The mold form 800 includes an elongated neck portion 802 that defines an axis along the elongated neck portion 802 (i.e. vertically in FIGS. 8-9). The mold form 800 includes a mold form body 824 that depends from the elongated neck portion 802. The mold form body 824 includes a head portion 804 that essentially enlarges the bottom of the neck portion 802, flaring outward, and then tapering back in under the head portion 804, and is configured to form a portion of the balloon that resembles the head of a human-like figure when inflated. Below the head portion 804 there are two upper appendages 806, 808 that extend downward, vertically, generally along the axis defined by the neck portion 802, generally mirroring each other in shape along the vertical axis. However, while the upper appendages 806, 808 extend downward from standoff portions 820, 822 at the sides of the mold form body 824, as they extend downward they traverse to the front of the mold form body 824. Thus, the standoff portions 820, 822 resemble the shoulder of a figure and the upper appendages 806, 808 are configured to form balloon portions that resemble arms of a human-like figure. a central body ridge 818 extends downward from below the head portion, and forms a ridge that extends forward. The resulting portion of the balloon formed by the central body ridge 818 can facilitate the outward deflection of the arm portions formed by the upper appendages 806, 808 upon inflation. The mold form body 824 splits into two leg portions 810, 812 or body segments that extend downward parallel along the vertical axis, each ending with a lower appendage 814, 816 at their respective distal ends (i.e. the bottom), and which extend forward, substantially perpendicular to the direction of the vertical axis of the neck portion 802. The two lower appendages 814, 816 are configured to form portions of the balloon that resemble the feet of a human-like figure.

It will be noted that spacing is maintained between the upper appendages 806, 808 and the central body ridge 818, and was as the sides of the other portions of the mold form body 824. In the side view of FIG. 9 it can be seen that the upper portion of the leg portion 812, for example, extends from near the back of the mold form body 824 to allow spacing between the upper appendages 806, 808 sufficient to facilitate removal of the balloon from the mold form 800.

Figure 19:
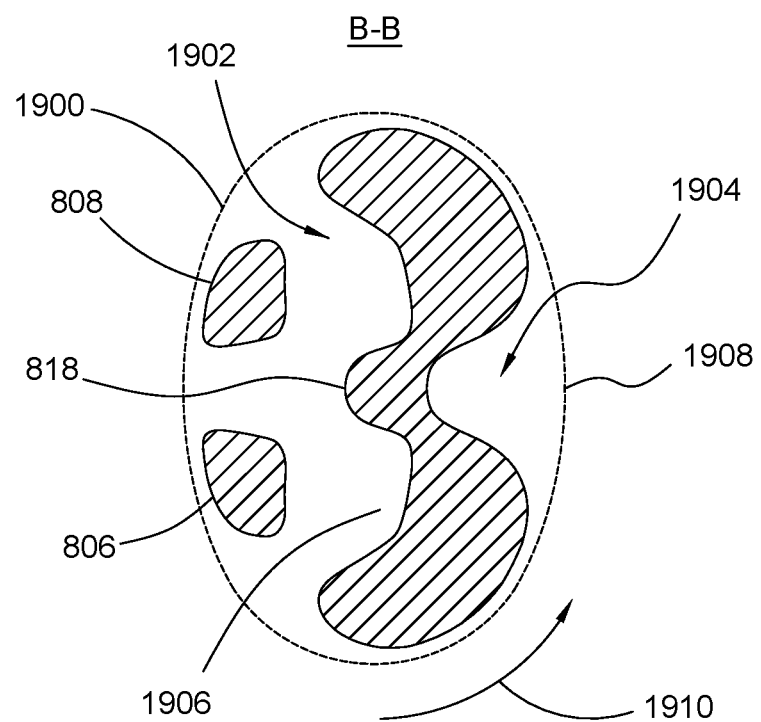
FIG. 19 is a cross section view of FIG. 9 at line BB.

FIG. 19 shows a cross section view through the material of the mold form 800 of FIG. 8 along line BB. The cross section cuts through upper appendages 806, 808 and the central body ridge 818 and integral portions of the mold form 800 that are the upper region of leg portions 810, 812.

Figure 20:
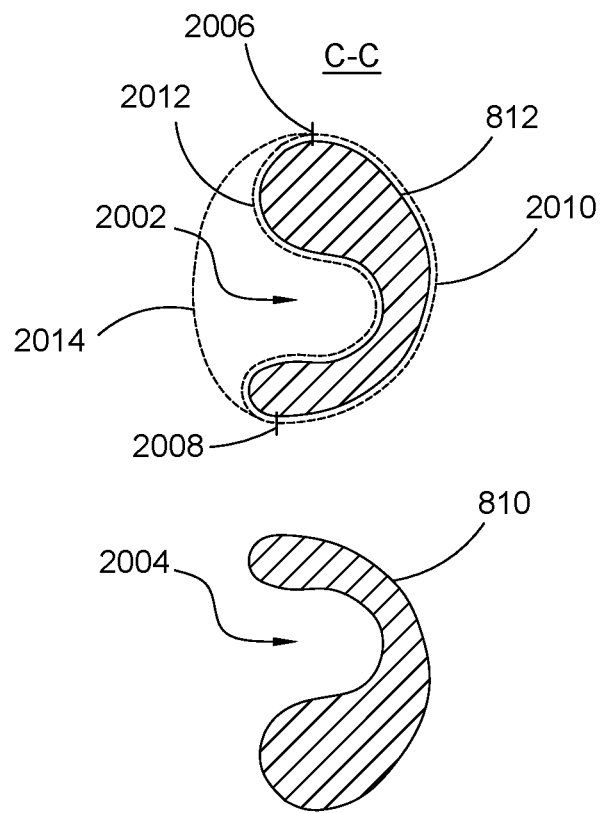
FIG. 20 is a cross section view of FIG. 9 at line CC.

As in FIG. 18, a circle or ellipse 1908 is shown surrounding the cross sectioned elements, and is not part of the mold form, hence it is shown in dashed line. The outer surfaces of the elements 806, 808, 818 do not extend outside of the boundary of 1900, which can be determined by, at least in part, a girth around the boundary 1900 as indicated by arrow 1910. As shown here, it can be seen that there are concave features or depressions 1902, 1904, 1906 formed in the body ridge. These features increase the surface area of the balloon material without exceeding or extending outside of the boundary of the ellipse/circle 1908. In FIG. 20, which shows a cross section view of FIG. 8 along line CC, which is farther down the mold form 800 at the leg portions 810, 812. Concave feature 2002 in leg portion 812 is a continuation of concave feature 1902, and concave feature 2004 in leg portion 810 is a continuation of concave feature 1906. Each of the leg portions 810, 812 are substantially similar in shape, and mirrored about an axis between them. The concave feature 2002, 2004 are formed on an "upper" side of the leg portions 810, 812, as demarcated on leg portion 812 between points 2006 and 2008, which is opposite a "lower" side of the leg portion. Points 2006, 2008 represent the widest points across the leg portion 812, opposite each other. The lower side of the leg portion 812 is along dashed line 2010 between points 2006, 2008. The upper side of the leg portion 812 follows dashed line 2012 along the concave feature 2002. The distance along dashed line 2012 is longer than the distance along dashed line 2010, and is also longer than the distance along a circular arc 2014 between points 2006, 2008 as a continuation of dashed line 2010. As used herein the path along dashed line 2010 is referred to as a lower path, and the path along the dashed line 2012 is referred to as an upper path. Thus, the concave feature increases the surface area of the balloon material along the leg portions over the concave features 2002, 2004. This is also true of concave features 1902, 1904, 1906.

Figure 11:
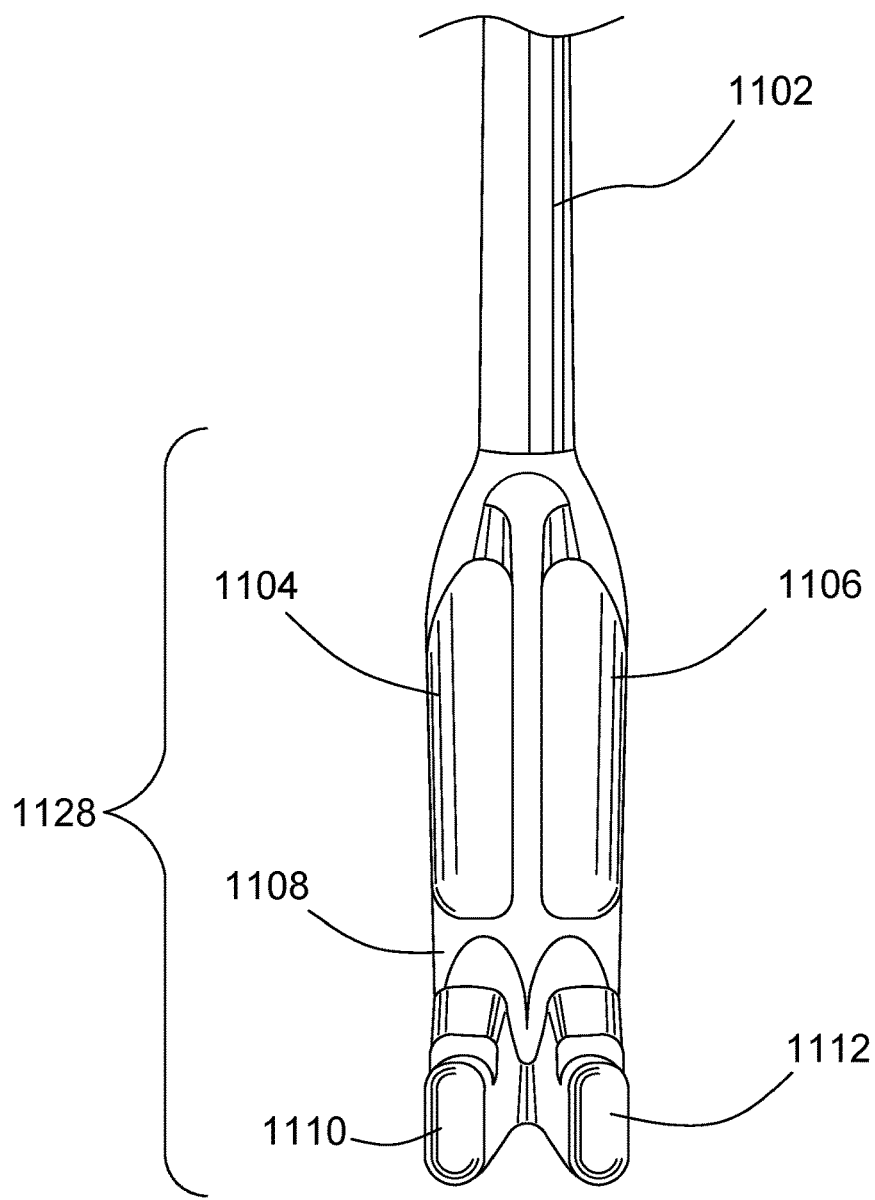
FIG. 11 is a front elevational view of a mold form for making balloons having multiple appendages, in accordance with some embodiments.
Figure 12:
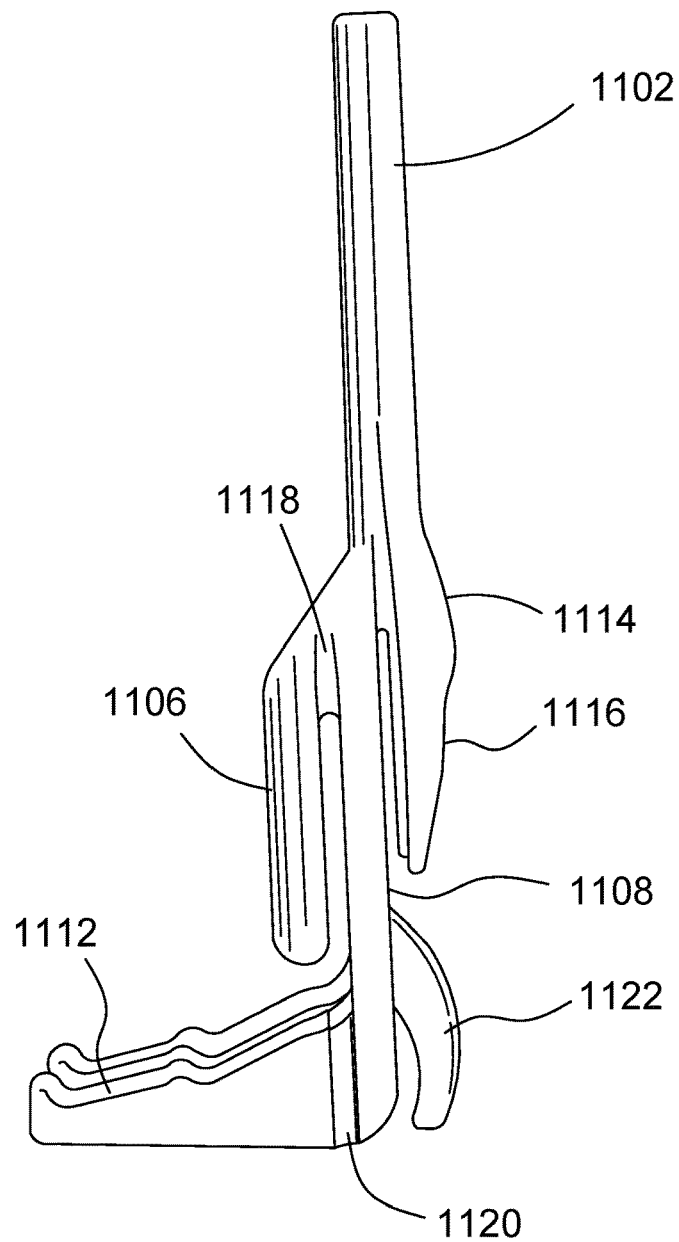
FIG. 12 is a side elevational view of a mold form for making balloons having multiple appendages, and showing arcuate reliefs formed on the outside of the appendages, in accordance with some embodiments.
Figure 13:
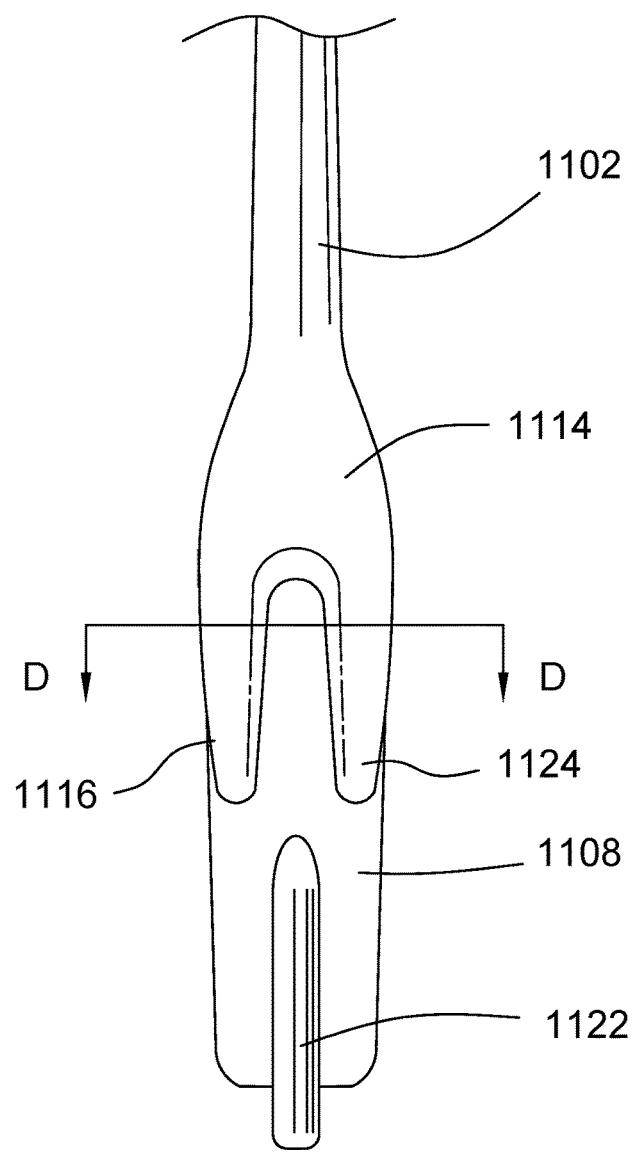
FIG. 13 is a real elevational view of a mold form for making balloons having multiple appendages, in accordance with some embodiments.
Figure 14:
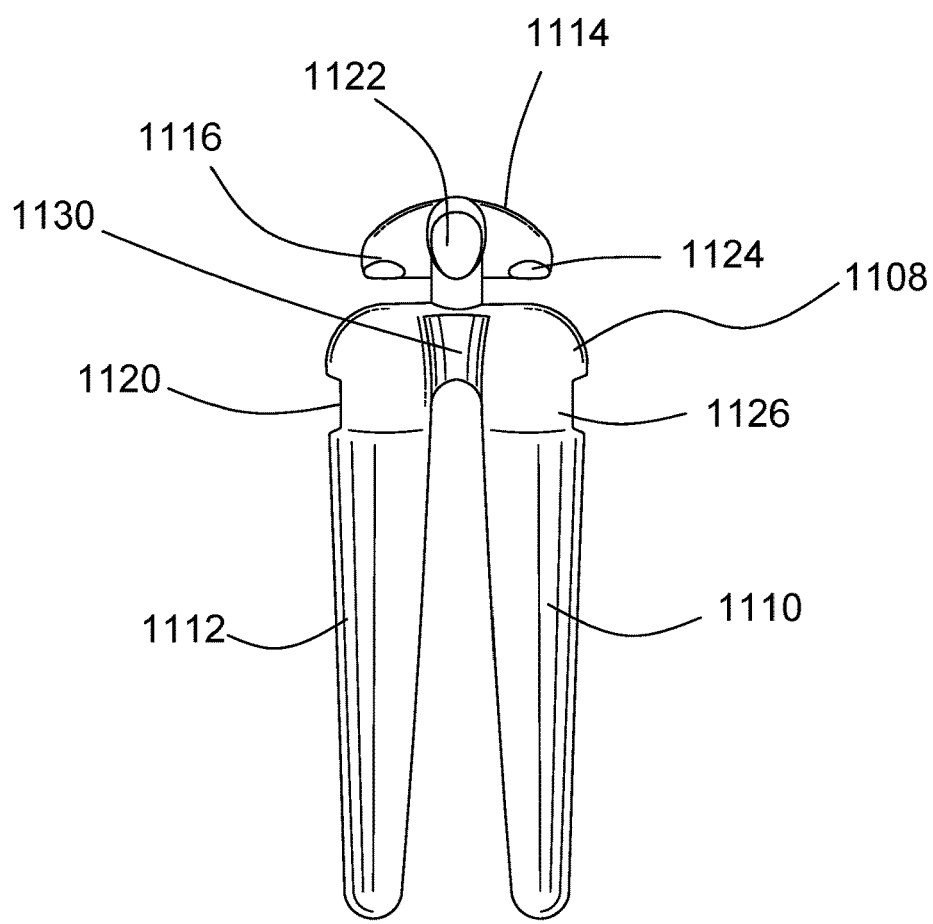
FIG. 14 is a bottom plan view of a mold form for making balloons having multiple appendages, and showing reliefs formed on the outside of some appendages, in accordance with some embodiments.

FIG. 11 is a front elevational view of a mold form 1100 for making balloons having multiple appendages, in accordance with some embodiments. The mold form 1100 is configured to form a balloon that, upon inflation, resembles a four-legged animal, such as a dog or a bull. FIGS. 12-14 show a side elevational view, rear elevational view, and a bottom plan view of the mold form 1100, respectively. As is a consistent feature of the mold forms in general, mold form 1100 includes an elongated neck portion 1102 that defines an axis (i.e. in the vertical direction). The elongated neck portion 1102 joins to a mold form body 1128 that depends from the neck portion 1102 downwardly, and generally along the vertical axis of the neck portion 1102. The mold form body 1128 includes a pair of upper appendages 1104, 1106 that are formed similarly to previously described upper appendages in that they include a standoff portion and an appendage body that extends substantially parallel to the vertical axis. The mold form body 1128 also includes a flat major portion 1108 that has a width that is wider than a diameter or width of the neck portion 1102. In this mold form 1102, the upper appendages depend from the upper region of the flat major portion 1108 adjacent or proximate to the location where the neck portion 1102 joins to the mold form body 1128. Furthermore, the upper appendages 1104, 1106 are entirely forward (i.e. not to the side) of the flat major portion 1108. In FIG. 11, the surface of the flat major portion 1108 that is in view will be the bottom of the belly of the animal shape formed by the inflated balloon. Accordingly, it will be understood that the directional references (e.g. "upper," "lower") used in describing the mold form 1100 and previously described mold forms are in the context of this disclosure, and are not meant to be carried forward in reference to the figures or shapes of the resulting balloons created using the disclosed mold forms. The upper appendages 1104, 1106 are configured to form portions of a balloon that resemble the front legs of an animal such as a dog or bull and are mirrored about a centerline along the vertical axis. At the bottom or distal end of the mold form body 1128 are two lower appendages 1110, 1112 that extend forward (i.e. in a direction out of the page in FIG. 11) from the flat major portion 1108, and are, like the upper appendages, mirrored about a centerline along the vertical axis. Stated another way, the lower appendages 1110, 1112 extend in a direction generally away from the vertical axis, and as shown, substantially perpendicular to the vertical axis. Upper appendages 1104, 1106 are mirrored shapes, meaning they have the same shape but are reversed about the axis of the mold form body 1128. The same is true of the lower appendages 1110, 1112.

Ordinarily portions of a balloon formed by any of the upper or lower appendages will, upon inflation of the balloon, extend outward from the balloon, to the side, at an undesirable angle, as will be described in reference to FIGS. 15 & 16. To mitigate this tendency, reliefs 1118 and 1120 are formed on the outside of the upper and lower appendages, respectively. The reliefs extend across the outside surface of their respective appendage, along the direction of the vertical axis, and as a result, the standoff portion, where the appendage body is attached to the rest of the mold form body, is narrower across in the direction perpendicular to the vertical axis. In FIG. 14 both reliefs 1120 and 1126 on the lower appendages can be seen under and immediately adjacent the flat major portion 1108. Furthermore, there can be seen that the lower appendages extend beyond the distal end 1130 of the flat major portion 1108.

In FIGS. 12-14 it can be seen that the mold form body includes a head portion 1114 that also depends from the elongated neck portion 1102. The head portion further includes two appendages 1116, 1124 that extend downward, substantially in the vertical direction. These appendages 1116, 1124 can be considered to be upper appendages as they are located at an upper portion of the mold form body 1128 and extend downward, along the direction of the axis defined by the elongated neck portion 1102. The appendages 1116, 1124 are configured to form portions of a balloon that, when the balloon is inflated, resemble ears or horns. Furthermore, in FIGS. 12-14, there is a tail appendage 1122, which is an intermediate appendage as it is between the upper and lower appendages, formed near the bottom of the flat major surface 1108, opposite the lower appendages 1110, 1112. The tail appendage 1122 extends from the flat major portion 1108 above the bottom or lower-most portion of the flat major portion 1108, and extends downwards, generally along the vertical axis.

Figure 21:
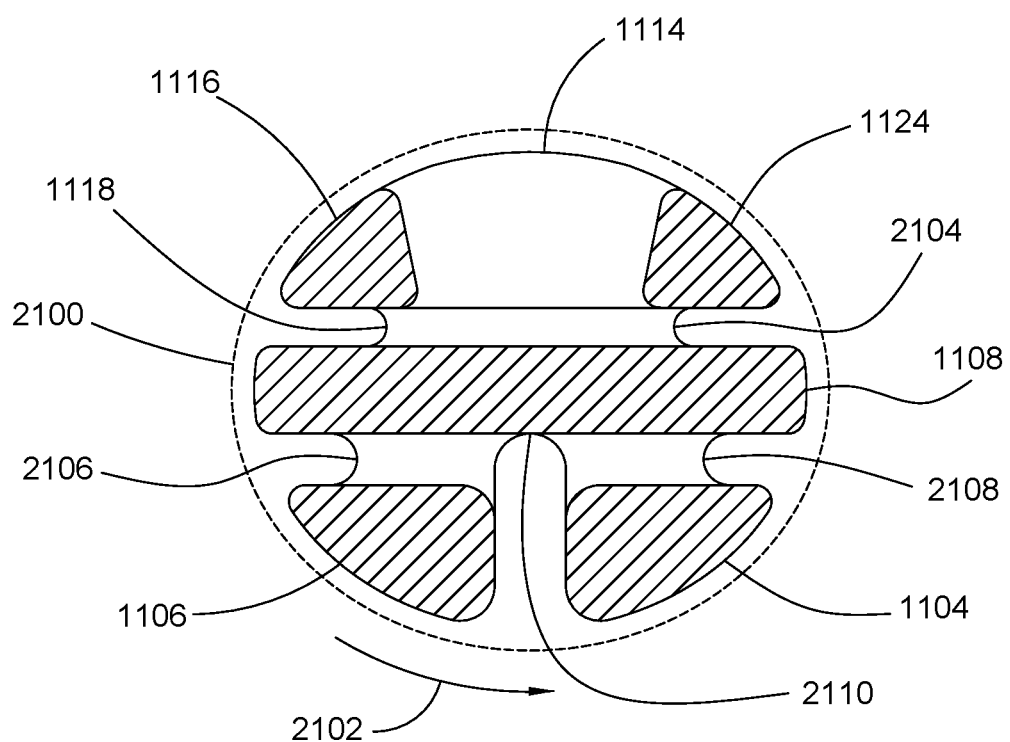
FIG. 21 is a cross section view of FIG. 13 at line DD.

FIG. 21 shows a cut away view of mold form 1100 taken along line DD. Upper appendages 1104, 1106, flat major portion 1108, and appendages 1116, 1124 are shown cross sectioned. The head portions 1114 is in view, and not cross sectioned at the position of line DD, as are the connecting portions between the head portion 1114 and the flat major portion 1108, and the portions of the mold form 1100 between the flat major portion 1108 and the upper appendages 1104, 1106. It can also be seen from this viewpoint that between these portions the reliefs or transition portions 1118, 2104, 2106, 2108, and 2110 are concave to be rounded, lacking sharp corners or edges. The cross section area of the mold form body is bounded by a circle/ellipse 2100 that is sized such that the nozzle of the balloon will fit over the circle/ellipse 2100 area without tearing. Further, the diameter of a circle or width of an ellipse bounding the cross section of the mold form 1100 is limited to ensure that the nozzle of the balloon will pass over the portion of the mold form 1100 without breaking or tearing.

In the various mold forms disclosed it can be seen that there is a general "L" shape, which could more accurately be described as an inverted "F" shape where the middle arm stroke is arranged to be parallel to the main vertical stroke, and extending toward the cap or top arm stroke (which would be at the bottom when inverted). This arrangement allows the creation of various appendages while also allowing the use of mass production techniques where machinery removes formed balloons from the mold forms under partial inflation and using suction/vacuum and/or mechanical elements that grip against the partially inflated balloon to pull it off the mold form. It is also contemplated that the lower appendage(s) can be omitted in forming some shapes, leaving only the upper appendage(s).

Figure 15:
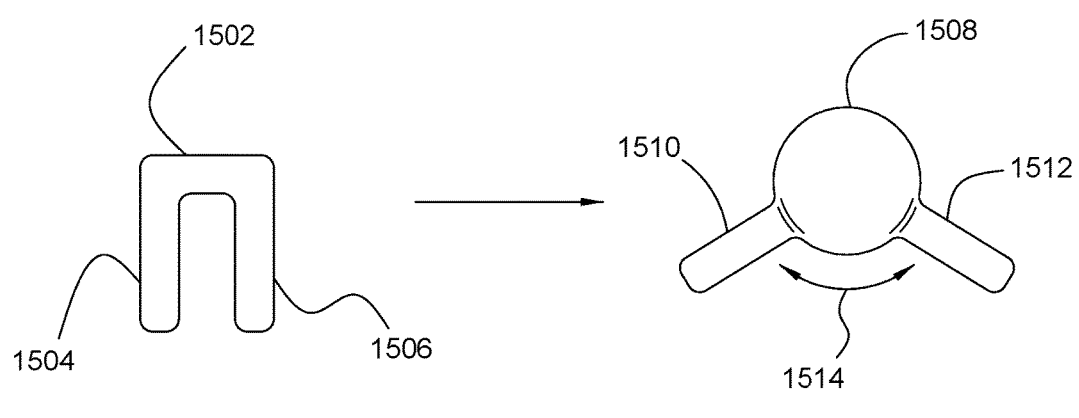
FIG. 15 shows a bottom plan view of a mold form with multiple appendages with no reliefs formed on the appendages, and a resulting balloon geometry, in accordance with some embodiments.

FIG. 15 shows a bottom plan view of a mold form with multiple appendages with no reliefs formed on the appendages, and a resulting balloon geometry, in accordance with some embodiments. Specifically, the mold form includes a mold form body 1502, shown here as a flattened mold form body, and extending from the mold form body 1502 are a pair of appendages 1504, 1506. Assuming the view of the mold form is from the bottom, looking along the vertical or longitudinal axis of the mold form, the appendages 1504, 1506 would be lower appendages as they extend away from the mold form body. The outer sides of the appendages 1504, 1506 are contiguous with the outer sides of the mold form body. The resulting balloon formed by this mold form will have a main body 1508, which will be generally round, even though the mold form body 1502 is flattened. The balloon also includes two legs 1510, 1512 that are formed extending from the main body 1508. Generally, upon inflation, the legs will be pointing nearly straight out from the main body 1508, producing an angle 1514 between them.

Figure 16:
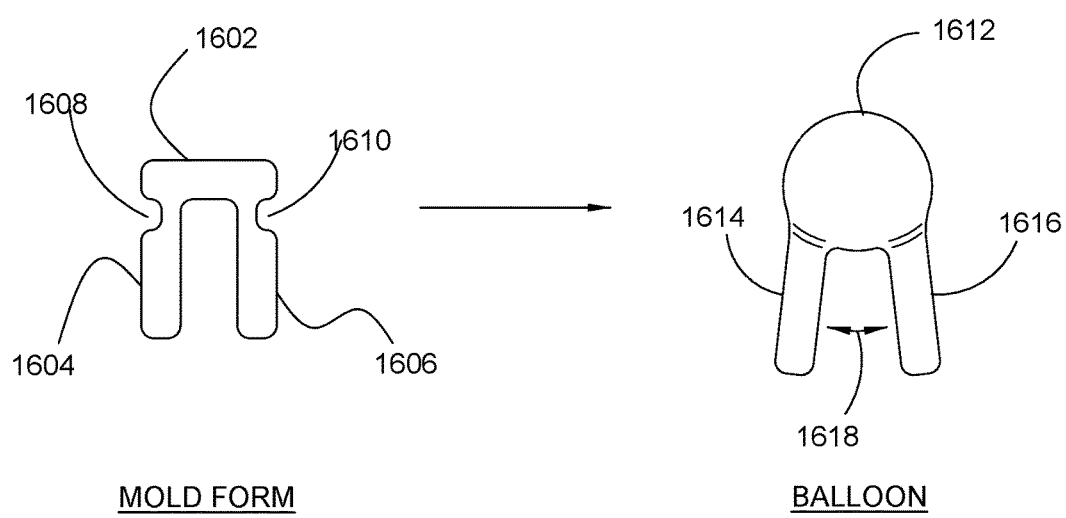
FIG. 16 shows a bottom plan view of a mold form with multiple appendages with reliefs formed on the appendages, and a resulting balloon geometry, in accordance with some embodiments.

FIG. 16 shows a bottom plan view of a mold form with multiple appendages with reliefs 1608, 1610 formed on the appendages 1604, 1606, respectively, and a resulting balloon geometry, in accordance with some embodiments. The appendages 1604, 1606 extend from a mold form body 1602. The reliefs are similar to reliefs 1118, 1120, 1126 of FIGS. 12 & 14, and extend across the outside surface of the appendages, adjacent the mold form body 1602. In some embodiments the reliefs 1608, 1610 could extend partly into the mold form body 1602. The reliefs 1608, 1610 create a differential in the amount of balloon material between the outside and the inside of the appendages 1604, 1606, which creates a tension differential when the balloon is inflated. As a result, in the inflated balloon, the legs 1614, 1616 extend from the main body 1612 of the balloon in a way that they are closer together, and the angle 1618 that is smaller than angle 1514, when no reliefs are used on the balloon mold. Thus, the inflated balloon in FIG. 16 includes legs 1614, 1616 that appear more directly "under" the main body 1612. Thus, the use of reliefs 1608, 1610 can result in a shape that more resembles a standing animal, for example, as compared to the balloon in FIG. 15 where the legs are splayed apart too far to resemble a standing animal.

Figure 17:
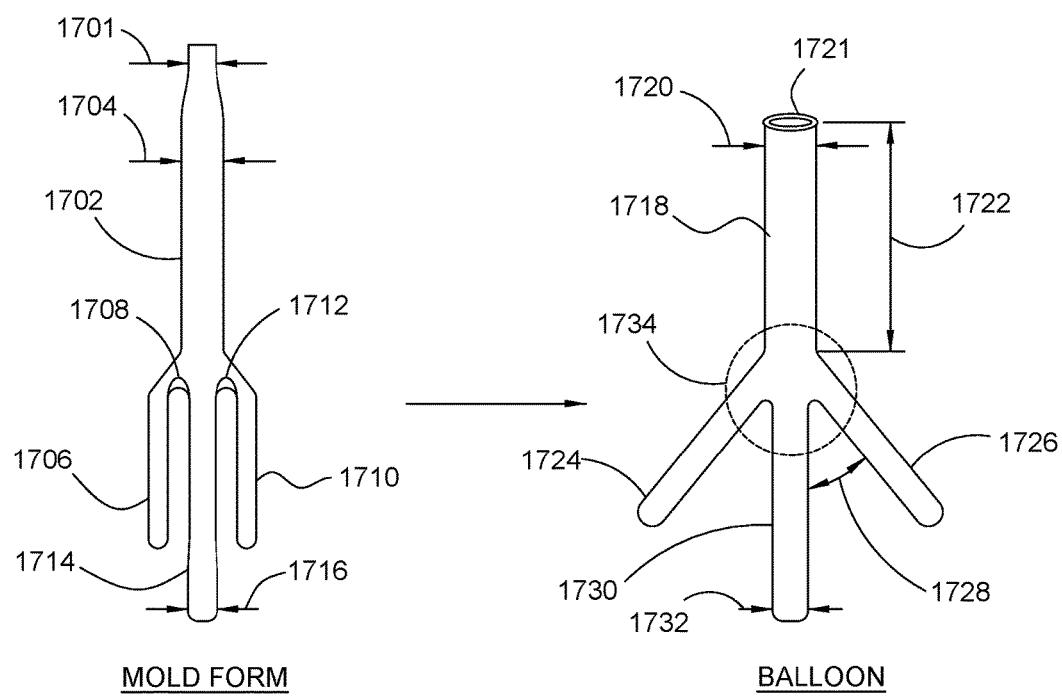
FIG. 17 shows a front elevational view of a mold form with multiple appendages, and a resulting balloon geometry, in accordance with some embodiments.

FIG. 17 shows a front elevational view of a mold form with multiple appendages, and a resulting balloon geometry, in accordance with some embodiments. The mold form and balloon geometry indicated here are used to explain some principles of mold form design and the resulting geometry or balloon shape that will result when the formed balloon is inflated. The mold form has elongated neck portion 1702 that has a neck diameter (or width) 1704. The neck joins to a mold form body including a pair of upper appendages 1706, 1710. On the lower side of the standoff portions of each of the upper appendages 1706, 1710 is a saddle-shaped relief 1708, 1712, respectively. Extending downward from the neck, along the vertical axis defined by the neck 1702, is a main or central body portion 1714. Any lower appendages that would normally be present are not shown here. The main body portion 1714 has a diameter or width 1716.

A balloon formed by the mold form in FIG. 17 includes a neck or upper body portion 1718 that, at rest, has a width 1720 and a length 1722. Opposing arms 1724 and 1726 are formed from upper appendages 1706, 1710. A lower body portion 1730 has a width 1732. When the balloon is being inflated, there is substantial pressure in region 1734, which causes the arms 1724, 1726 to extend away from the vertical axis, at angle 1728. The angle 1728 is, in part, controlled by the difference in the widths 1720, 1732. If, for example, width 1732 is larger than width 1720 (e.g. portion 1714 is larger in diameter than the neck diameter 1704) then the angle will be greater than ninety degrees. When greater width 1720 is over width 1732, the smaller angle 1728 will be as a result. Furthermore, care should be taken with the length 1722 of the neck, since, if it is too short, relative to its width 1720, then the neck 1718 and region 1734 will essentially merge into a single portion when the balloon is inflated.

Embodiments for a balloon mold form have been disclosed that provide for the production of balloons have multiple appendages, and in particular upper and lower appendages or arms or similar portions extending from the balloon. The disclosed embodiments provide further for the mass production of balloons using the conventional pressure method to partially inflate the balloon on the mold form and pull or suck the balloon off the mold form for further processing. The disclosed mold forms therefore provide the benefit of producing balloons that can resemble a variety of shapes that resemble recognized shapes with portions that extend from the balloon at the middle and end of the balloon, and at positions in between as well.

What is claimed is:

1. A balloon mold form for producing a shaped balloon that stretches upon inflation and having multiple appendages, comprising:
   an elongated neck portion that defines a longitudinal axis; and
   a mold form body depending from the elongated neck portion at an upper-most portion of the mold form body, and extending generally along the longitudinal axis, the mold form body having at least one upper appendage having a standoff portion that depends from the mold form body at an attachment location on the mold form body, and includes an appendage body that is spaced away from the mold form body and extends from the standoff portion towards a distal end of the mold form body substantially parallel to the longitudinal axis;
   wherein the mold form body further comprises at least one lower appendage that depends from the mold form body at the distal end of the mold form body, and which extends away from the mold form body in a direction that is substantially perpendicular to the longitudinal axis, and wherein the at least one upper appendage and the at least one lower appendage have a length to width ratio of at least three to one;
   wherein the at least one upper appendage comprises two upper appendages, each one of the two upper appendages forming a mirrored shape of the other; and
   wherein the standoff portion of each of the two upper appendages comprises a relief formed on an outside of the standoff portion that runs parallel to the longitudinal axis such that each standoff portion is narrower than the appendage body.

2. The balloon mold form of claim 1, wherein the at least one lower appendage comprises two lower appendages, each one of the two lower appendages forming a mirrored shape of the other lower appendage.

3. The balloon mold form of claim 1, wherein the mold form body comprises a flat major portion between the at least one upper appendage and the at least one lower appendage.

4. The balloon mold form of claim 1, wherein the mold form body further comprises a head portion formed at a point where the mold form body depends from the elongated neck portion.

5. The balloon mold form of claim 4, wherein the head portion does not depend from the mold form body.

6. The balloon mold form of claim 3, wherein the flat major portion has a width that is wider than a width of the elongated neck portion.

7. The balloon mold form of claim 1, wherein the mold form body is split into at least two parallel body segments extending parallel along the longitudinal axis.

8. The balloon mold form of claim 1, wherein each of the at least two lower appendages include a relief formed on an outside of each one of the at least two lower appendages, the relief on each one of the at least two lower appendages extends parallel to the longitudinal axis at a location adjacent the mold form body.

9. The balloon mold form of claim 1, further comprising at least one intermediate appendage depending from the mold form body between the at least one upper appendage the at least one lower appendage.

10. The balloon mold form of claim 1, wherein the elongated neck portion is cylindrical.

11. A balloon mold form for creating an inflatable balloon that stretches upon inflation, and which has a shape including appendages when inflated, the balloon mold form comprising:
   an elongated neck portion that defines a longitudinal axis;
   a mold form body depending from the elongated neck portion at a lower-most portion of the elongated neck portion, and extending generally along the longitudinal axis, the mold form body having:
      at least two upper appendages, each of the at least two upper appendages having a standoff portion that depends from the mold form body at an attachment location on the mold form body, and an appendage body that is spaced away from the mold form body and extends from the standoff portion towards a distal end of the mold form body substantially parallel to the longitudinal axis; and
      at least one lower appendage that depends from the mold form body at the distal end of the mold form body, and which extends away from the mold form body in a direction that is substantially perpendicular to the longitudinal axis;
   wherein the standoff portion of each of the two upper appendages comprises a relief formed on an outside of the standoff portion that runs parallel to the longitudinal axis such that the standoff portion is narrower than the appendage body.

12. The balloon mold form of claim 11, wherein the mold form body comprises a flat major portion between the at least two upper appendages and the at least one lower appendage, and which defines a plane.

13. The balloon mold form of claim 12, wherein the at least one lower appendage extends from the flat major portion contiguously and in the plane of the flat major portion.

14. The balloon mold form of claim 12, wherein the at least one lower appendage extends from the flat major portion in a direction normal to the plane of the flat major portion.

15. The balloon mold form of claim 11, wherein the mold form body is split into at least two parallel body segments extending parallel to the longitudinal axis, and the at least one lower appendage comprises two lower appendages, each one of the two lower appendages extending from a distal end of a respective one of the at least two parallel body segments.

16. The balloon mold form of claim 11, wherein the at least one lower appendage comprises two lower appendages, each one of the two lower appendages forming a mirrored shape of the other, and wherein each of the two lower appendages comprise a relief formed on an outside of the lower appendage that extends across the appendage parallel to the longitudinal axis at a location adjacent the mold form body.

* * * * *